United States Patent Office 3,065,638
Patented Nov. 27, 1962

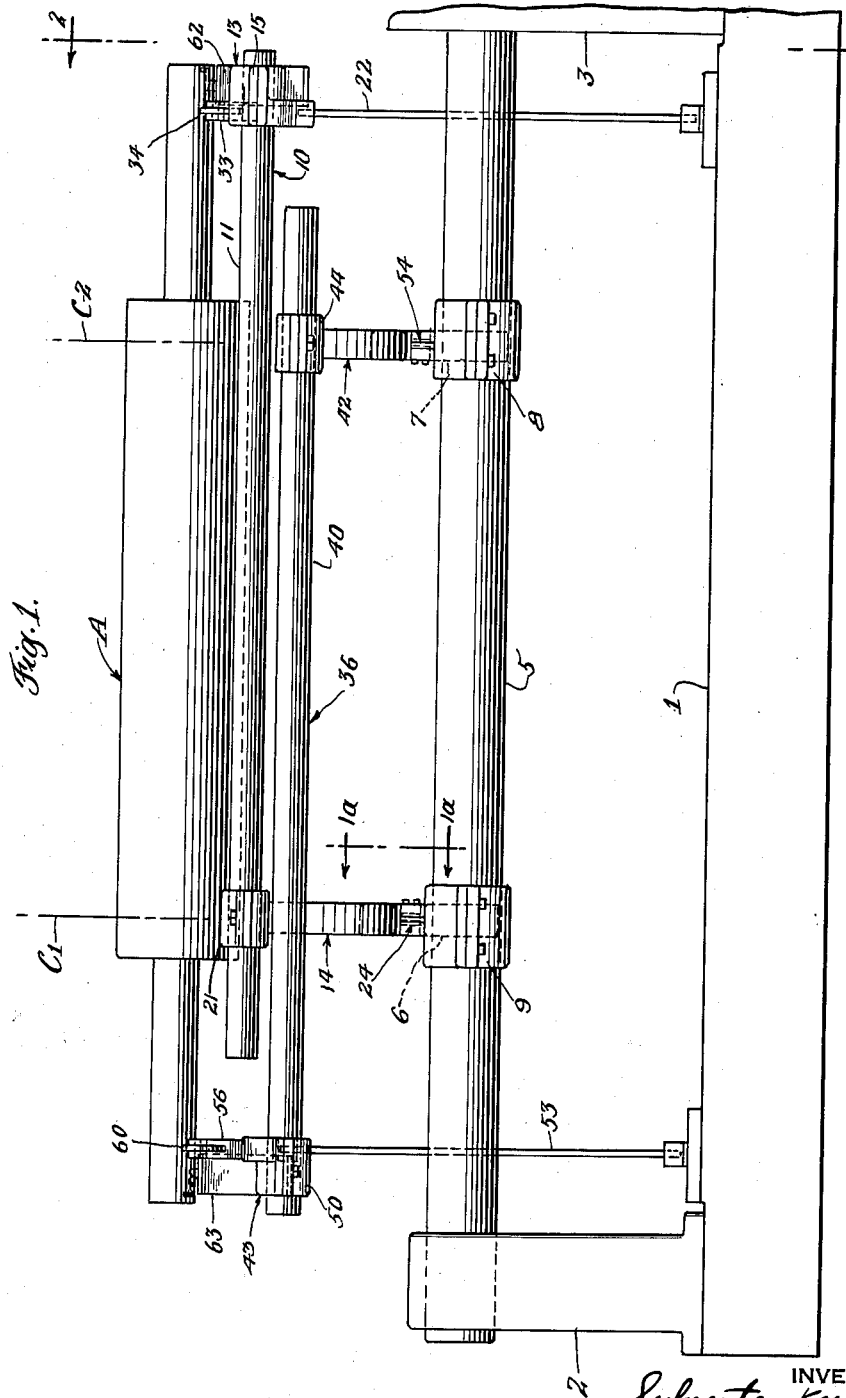

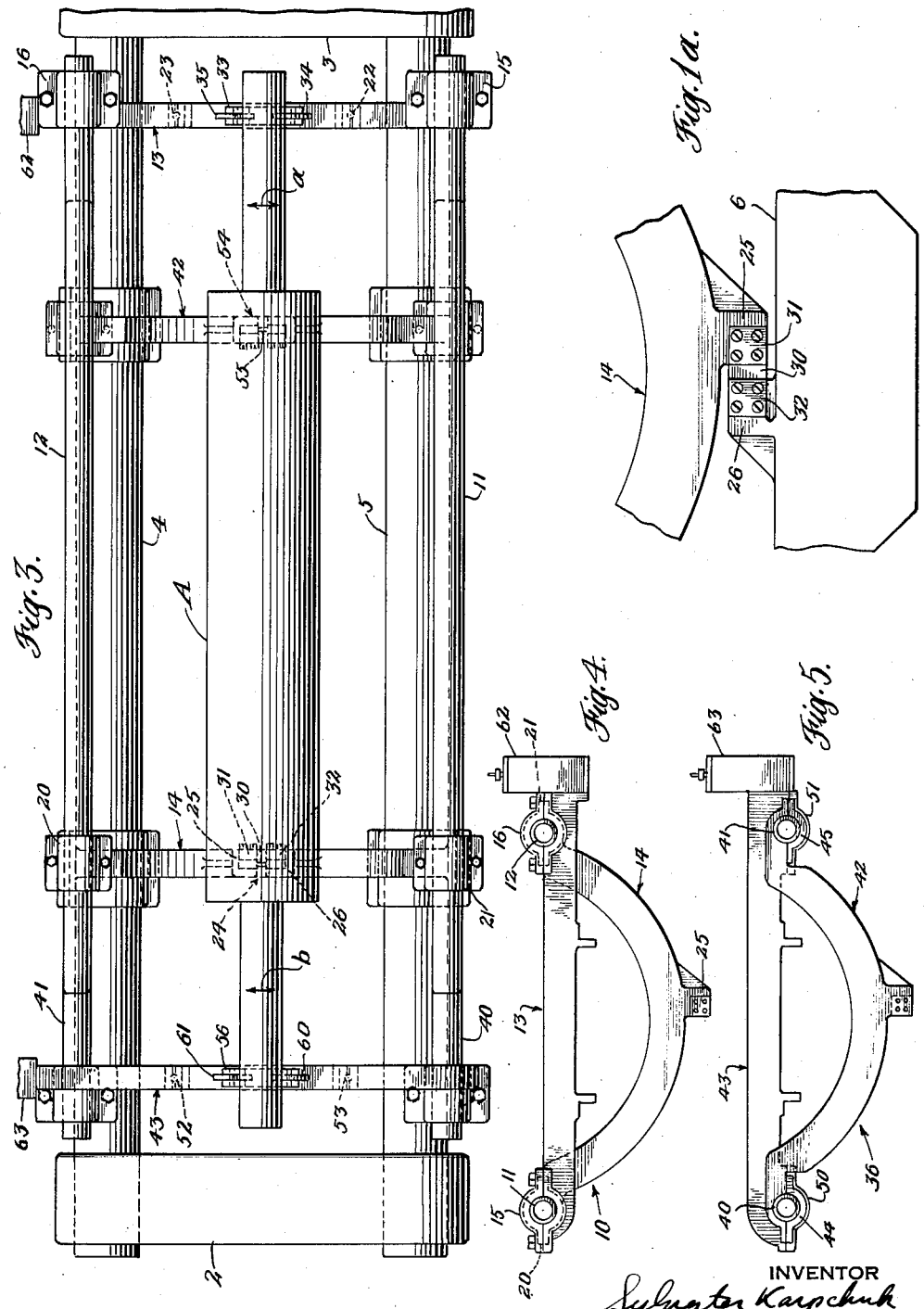

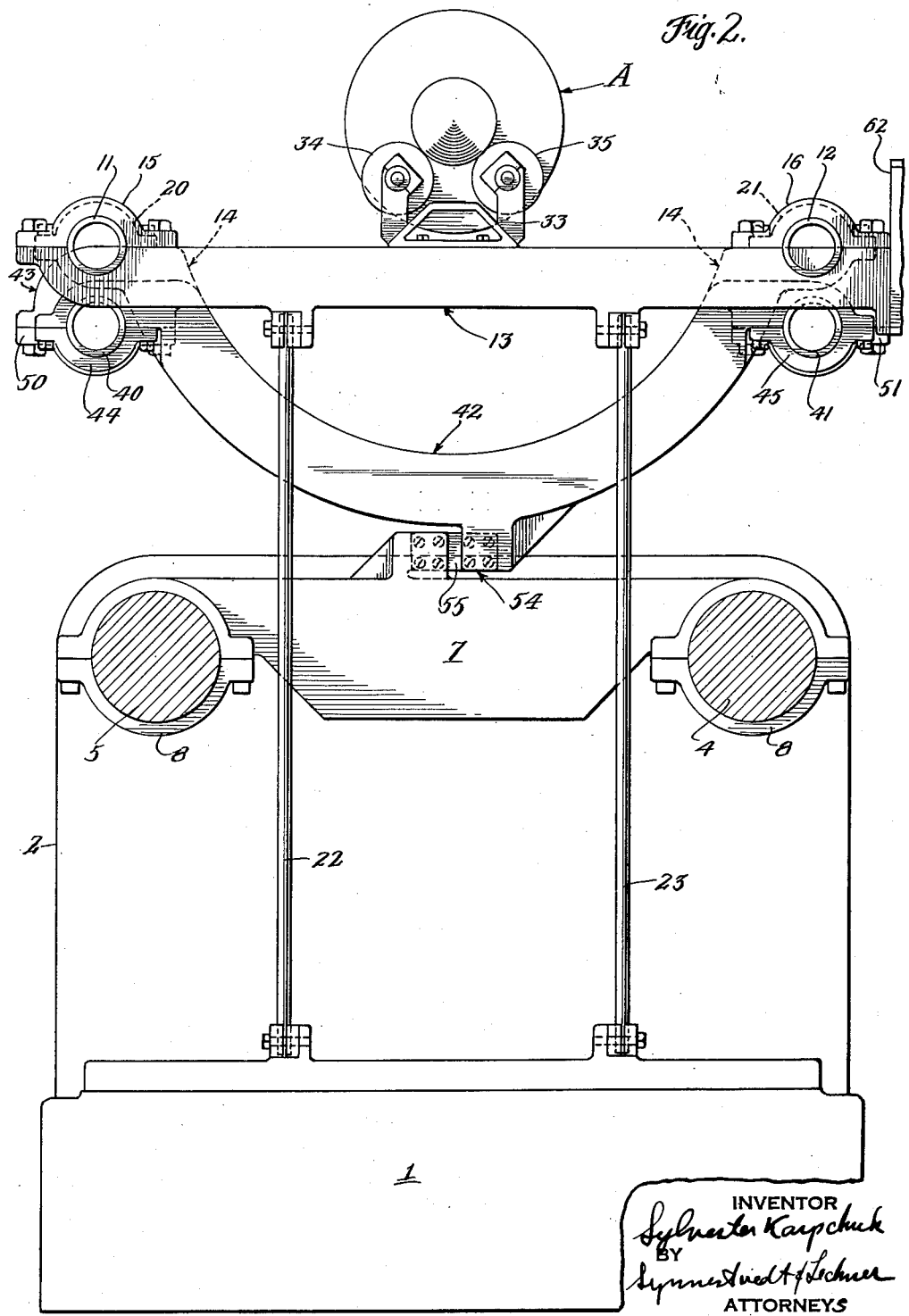

3,065,638
CRADLE FOR BALANCING MACHINE
Sylvester Karpchuk, Philadelphia, Pa., assignor to Tinius Olsen Testing Machine Company, Willow Grove, Pa., a corporation of Pennsylvania
Filed Nov. 25, 1959, Ser. No. 855,409
5 Claims. (Cl. 73—477)

This invention relates to balancing apparatus and in particular relates to cradle mechanism for supporting an article to be tested for unbalance.

For testing an article for unbalance, it is usual to rotatably mount the article in a cradle which is supported by elastic means permitting the cradle to vibrate as a function of the unbalance and to employ an electrical pickup to sense the cradle vibration or the unbalance, the signal generated being used in connection with certain other equipment to determine the amount and location of unbalance. In static unbalance determination the testing is done in a single correction plane and in dynamic unbalance determination the testing is done in two correction planes.

In machines of the kind mentioned it is important that the unbalance signal of a correction plane be proportional to the unbalance in that plane and not contain a component due to the unbalance in the other plane. In other words, there should not be unbalance interaction between planes. The providing of such condition is commonly referred to by those in the art as "plane separation." A typical mechanical system for accomplishing the foregoing includes a pair of pivots which are respectively located in the correction planes and alternatively engageable with the cradle. The intended operational effect desired is that when one pivot is engaged and the other disengaged, the unbalance in the plane containing the free pivot will cause the cradle to vibrate (about the engaged pivot) but that the unbalance in the plane containing the engaged pivot will not cause vibration. That being the case, measurements taken in the plane containing the free pivot would be proportional only to the unbalance in that plane.

In other instances the machine may be of the pivotless type with the cradle supported so that it is free to vibrate as a function of the unbalance in both planes and in such instances electrical circuitry is provided for nulling out or compensating for the effects of interaction.

The pivot type machine has certain advantages in balancing work, particularly in that it is independent of the center of gravity or the natural center of percussion of the part. Pivotless type machines have a disadvantage in that they are not independent of the center of percussion and this phenomenon gives rise to calibration problems and has a detrimental effect on the accuracy of measurements. The pivot type machine, while independent of the problems of the center of percussion, has a disadvantage, particularly where a part must be balanced at very high speed because in the high speed range the pivots fail to provide for complete plane separation which results in interaction. This, of course, is detrimental to the accuracy of measurements.

The present invention contemplates the use of pivots in order to be independent of the center of percussion but with the pivots and cradle interrelated so that automatic plane separation is obtained without the effects of interaction even at high speeds.

For this purpose the invention contemplates a two-part cradle each part having means for rotatably supporting an article to be tested with the parts being mounted for vibration independently of each other respectively in the correction planes of the article.

A preferred form of the invention will be understood from the following description and drawings wherein:

FIGURE 1 is a side elevational view of a typical balancing machine having a cradle constructed in accordance with the invention;

FIGURE 1a is a fragmentary view taken along the line 1a—1a of FIGURE 1;

FIGURE 2 is an enlarged cross section taken on the line 2—2 of FIGURE 1;

FIGURE 3 is a plan view of FIGURE 1;

FIGURE 4 is an end view of one of the cradles looking from the right-hand side of FIGURE 1; and FIGURE 5 is an end view of the other cradle also looking from the right-hand side of FIGURE 1.

In FIGURE 1 the base of the machine comprises a lower support member on opposite ends of which are upright standards 2 and 3, the two standards being interconnected by a pair of spaced rods 4 and 5 which carry the cross pieces 6 and 7 held on the rods by the pairs of caps 8 and 9.

The first cradle 10 has a pair of spaced tubular members 11 and 12 (FIGURES 3 and 4) which are interconnected on the right-hand side by a bridge 13 and on the left-hand side by a bridge 14. On the bridge 13 the tubular members 11 and 12 are held by the caps 15 and 16 (FIGURES 2 and 4). On the bridge 14 (FIGURE 3) the tubular members 12 and 13 are held by the caps 20 and 21.

The cradle 10 on its right-hand side is supported by a pair of elastic rods 22 and 23 (FIGURE 2), both of which extend between the lower plate 1 and the bridge 13. On the left-hand side the bridge 14 supports the cradle on a pivot mechanism 24 (FIGURES 1 and 1a). The pivot is of the flexure plate type and is constructed by means of an ear 25 on the bridge 14 and an ear 26 on the cross piece 6 between which the flexure plate 30 is secured by the clamps 31 and 32. The bridge 13 (FIGURE 2) carries a bracket 33 which mounts a pair of rollers 34 and 35 respectively rotatably supporting the right-hand end of the article A.

The second cradle 36 has a pair of spaced tubular members 40 and 41 (FIGURES 3 and 5) which are interconnected on the right-hand side by a bridge 42 and on the left-hand side by a bridge 43. On the bridge 42 the tubular members 40 and 41 are held by the caps 44 and 45. On the bridge 43 the tubular members 40 and 41 are held by the caps 50 and 51.

The cradle 36 is supported on its left-hand side by a pair of elastic rods 52 and 53. The rods extend between the lower plate 1 and the bridge 43. On the right-hand side the bridge 42 supports the cradle on a pivot mechanism 54 (FIGURE 2) having a flexure plate 55, the pivot mechanism being identical in construction to the pivot mechanism 24 described above. The bridge 43 carries a bracket 56 (FIGURE 3) carrying the rollers 60 and 61 for rotatably supporting the left-hand end of the article A.

The pivot mechanisms 24 and 54 are arranged so that the same parts of the flexure plates lie in the same vertical plane. The rollers 34 and 35, 60 and 61 support the article A so that its axis of rotation lies in a vertical plane containing the same parts of the flexure plates. It will be noted that the cradles 10 and 36 are arranged in superimposed relationship.

From an inspection of FIGURE 1 it will be seen that the pivots 24 and 54 respectively lie in the correction planes of the article C–1 and C–2. Where the article is of a nature so that the correction planes are spaced closer together, the pivot mechanisms may be appropriately adjusted by loosening the various caps which hold the bridges 14 and 42 and cross pieces 6 and 7.

The manner in which the cradles operate will be explained below. Assume that the article A has unbalance only in the right-hand correction plane C-2. When the article is rotated the unbalance will cause the cradle 10 to vibrate. The vibratory motion of the cradle is restrained by the rods 22 and 23 so that the cradle motion lies in a horizontal plane (for example, the plane of the paper as viewed in FIGURE 3) about the pivot 24 and in a direction indicated by the arrows $a$. This vibratory motion of the cradle 10 is sensed by an electrical pickup, preferably an inertia type pickup which is fixedly secured to the cradle. Such a pickup is indicated by 62.

Now, assume that the article A has unbalance in both of the correction planes C-1 and C-2. The unbalance in the plane C-2 will cause cradle 10 vibration as explained above. However, the unbalance in the plane C-1 cannot cause the cradle 10 to vibrate in the plane C-1 because the cradle 10 in the plane C-1 is held by the pivot 24. Except as noted hereinafter the signal generated by the pickup 62 will be proportional to the unbalance in the plane C-2.

With respect to the cradle 36, assume that all of the unbalance is located in the correction plane C-1. With the article rotating, the unbalance will cause the cradle 36 to vibrate about the pivot 54 and in a direction indicated by the arrows $b$. Even with unbalance in the plane C-2, it will be observed that this cannot cause the cradle 36 to vibrate in the plane C-2 because the cradle 36 is held by the pivot 54. Except as noted hereinafter the signal generated by the pickup 63 secured to the cradle 36 will be proportional to the unbalance in the correction plane C-1.

The invention is ideally suited for use in those instances where a part is to be balanced at high speeds for example 1,500 r.p.m. and up. As to very high speed operation, I have successfully balanced articles on a machine constructed with rotational speeds of 12,000 r.p.m.

At very low speeds, for example 500 r.p.m. and below, I have found that there is some interaction between the planes and I believe this is due principally to the fact that at lower speeds the amplitude of vibration of the cradle is exceedingly larger than the amplitude at high speeds. For example, with unbalance, say only in the plane C-2, the vibration of the article about the pivot 24 may cause the left end of the article to impart some degree of vibration to the rollers 60 and 61 and hence to the cradle 36. Any such interaction can be reduced to a negligible extent by minimizing the distance (taken along the axis of the article) between the pivot 24 and the rollers 60 and 61 and also, of course, between the rollers 34 and 35 and the pivot 54. In any event, such interaction is small and does not appear at the higher speeds. I have not shown any means for rotating the article A as any of the conventional means are applicable, for example, a driven belt extending over the article A and frictionally engaged therewith or, alternatively, an adapter secured to one end of the article and coupled to a drive shaft.

I claim:
1. Apparatus for supporting a workpiece to be tested for unbalance:
   a first horizontally extending cradle;
   a second horizontally extending cradle disposed above said first cradle;
   first elastic means connected to said first cradle;
   second elastic means spaced from said first elastic means and connected to said second cradle;
   first and second pivot means spaced from one another and disposed between said first and second elastic means and respectively connected to said first and second cradles, the first pivot means and the first elastic means cooperating to permit vibration of the first cradle in a horizontal plane about a vertical axis provided by the first pivot means and the second pivot means and the second elastic means cooperating to permit vibration of the second cradle in a horizontal plane about a vertical axis provided by the second pivot means; and
   means on said first cradle and means on said second cradle for respectively mounting opposite ends of a workpiece to support the workpiece for rotation about a horizontal axis.

2. A construction in accordance with claim 1 wherein each said elastic means comprises a pair of elastic rods disposed respectively on opposite sides of said rotational axis.

3. A construction in accordance with claim 1 wherein each said pivot comprises a vertically extending flexure plate.

4. A construction in accordance with claim 1 further including mechanism supporting each said pivot means and providing for the pivot means to be moved toward and away from one another in a direction parallel to said rotational axis.

5. In appartaus for determining the unbalance in:
   a test rotor which includes end shafts and two correction planes located between the end shafts, the sub-combination comprising: two elongated, horizontally extending cradles mounted one over the other and for movement independently of each other, one end of each cradle including means rotatably supporting one end shaft of the rotor and an electric vibration pickup, said one end of each cradle being supported by flexible means which permits vibration in a horizontal plane and in a direction transverse to the rotational axis of the test rotor, the other end of each cradle being supported by pivot means which permits pivotal movement of the cradle about a vertical axis, the pair of pivot means being located between the pair of flexible means and below the axis of the test rotor; and adjusting means which permits the pivot means for each cradle to be disposed and in the correction plane fartherest from said one end of each cradle.

References Cited in the file of this patent

UNITED STATES PATENTS

| | | |
|---|---|---|
| Re. 19,812 | Moyer et al. | Jan. 7, 1936 |
| Re. 23,785 | Weaver et al. | Feb. 16, 1954 |
| 1,591,855 | Marsland | July 6, 1926 |
| 1,878,129 | Griswold | Sept. 20, 1932 |
| 2,041,771 | Lundgren | May 26, 1936 |
| 2,088,553 | Olsen | July 27, 1937 |
| 2,210,285 | Exter | Aug. 6, 1940 |
| 2,451,863 | Oakley | Oct. 19, 1948 |
| 2,857,764 | Frank | Oct. 28, 1958 |
| 3,008,327 | Hrebicek | Nov. 14, 1961 |